Figure 1:
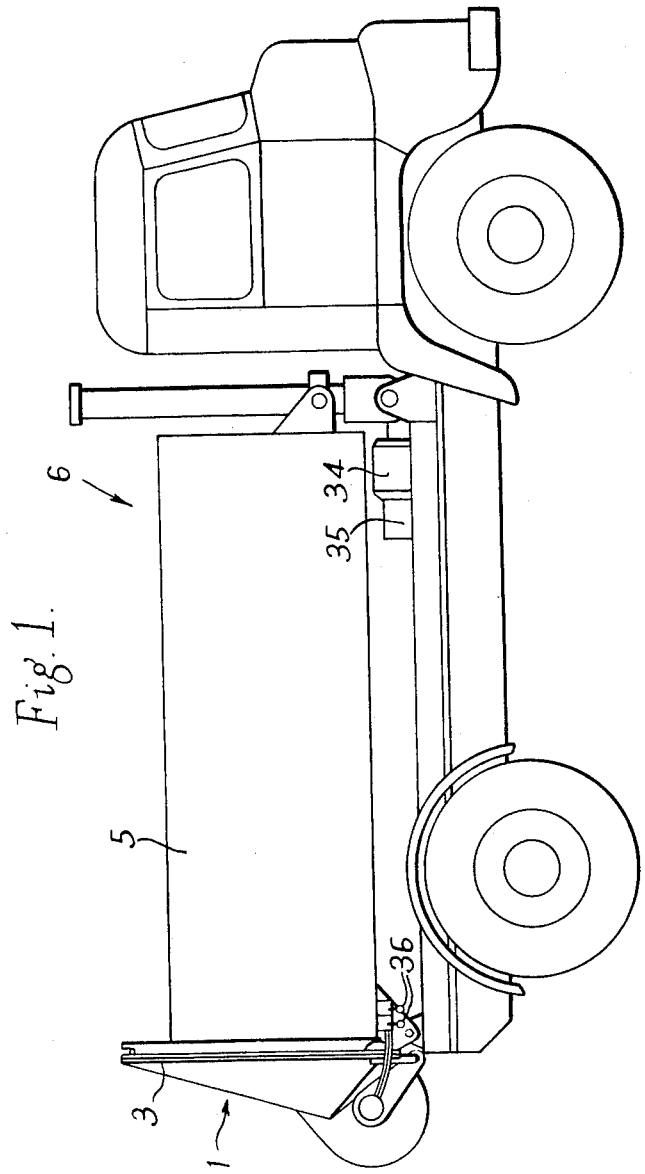

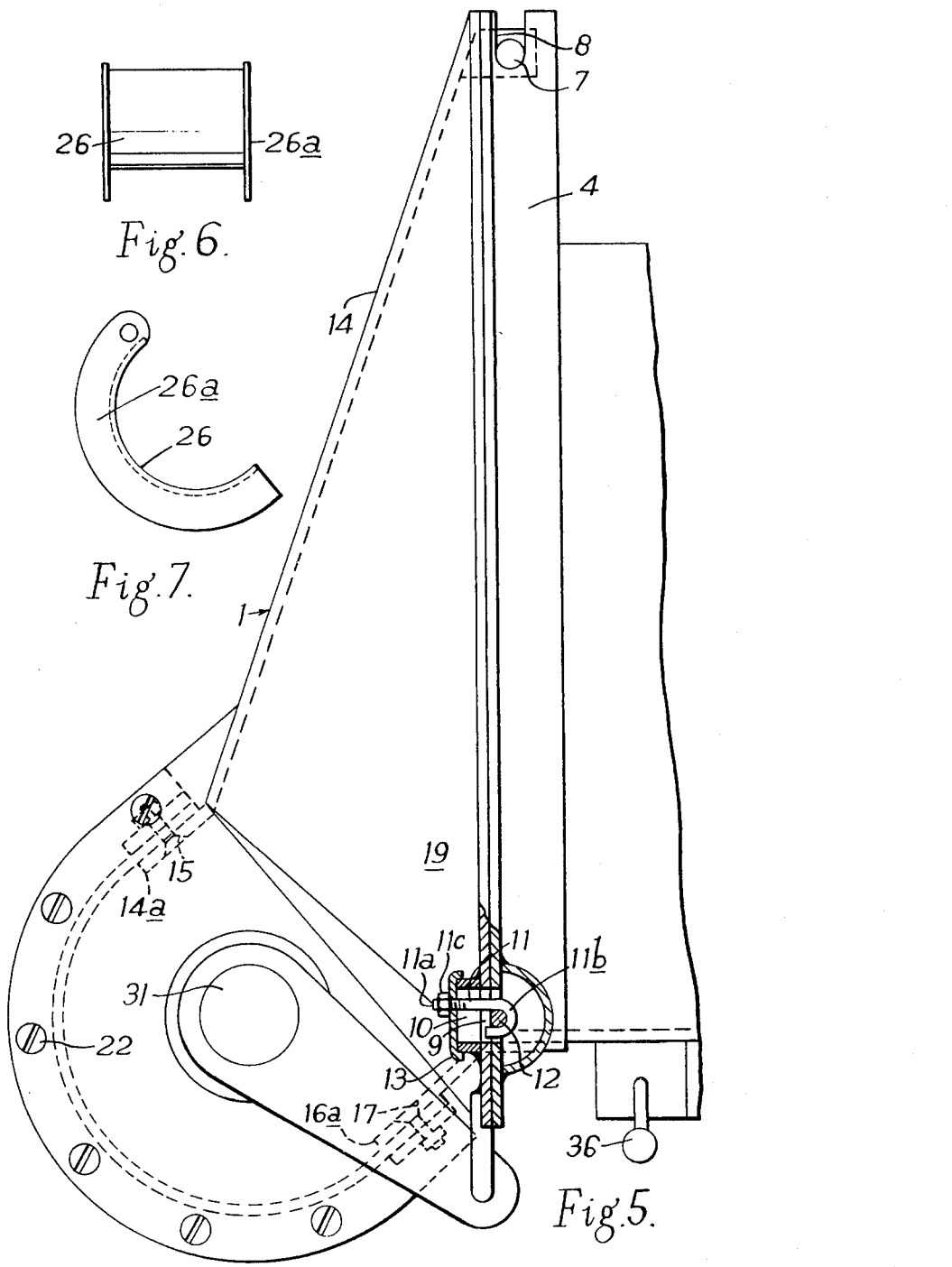

July 5, 1966 G. J. GALLAGHER 3,259,261
MEANS FOR DISCHARGING CONCRETE AND THE LIKE
FROM TRANSPORT VEHICLES
Filed May 21, 1964 7 Sheets-Sheet 6

July 5, 1966 G. J. GALLAGHER 3,259,261
MEANS FOR DISCHARGING CONCRETE AND THE LIKE
FROM TRANSPORT VEHICLES
Filed May 21, 1964 7 Sheets-Sheet 7

United States Patent Office 3,259,261
Patented July 5, 1966

3,259,261
MEANS FOR DISCHARGING CONCRETE AND THE LIKE FROM TRANSPORT VEHICLES
Gerard Joseph Gallagher, 21 Oakhurst Drive,
Kenton Park, Newcastle-upon-Tyne, England
Filed May 21, 1964, Ser. No. 369,206
Claims priority, application Great Britain, May 23, 1963,
20,525/63
1 Claim. (Cl. 214—503)

This invention appertains to the provision of means, in a wheeled transport vehicle, for the discharge from the vehicle body of a load of concrete, mortar or a like mix.

Heretofore, when concrete has been carried for any distance in a road vehicle of the type having a tipping body furnished with a conventional hinged, i.e. swinging, tail-gate, difficulty has been encountered when attempting to discharge the load through the said gate. This difficulty is primarily due to the fact that the concrete becomes compacted, in transit, by the bumping about and shaking of the vehicle body, so that discharge can only be achieved at all by tipping the body to its extreme inclination and, even then, the concrete is usually deposited in an un-controlled manner into a single heap. This inability to secure controlled and regular discharge of concrete from such a vehicle body constitutes a serious disadvantage of this form of transport—which is otherwise substantially less expensive than the known system involving the use of specially designed rotating drums fitted to mixing and agitating vehicles.

Accordingly, the object of the present invention is to provide, in a non-agitating transport vehicle suitable for the conveyance of concrete, mortar or a like mix, simple, relatively inexpensive and efficient means designed to effect a controlled and regular discharge of the mix from the body of the vehicle.

Although it is primarily the intention to apply the invention to a road vehicle of the type having a tipping body as aforesaid, there is no limitation in this respect. Thus, for instance, the invention is equally applicable to any appropriate road transport vehicle haivng a fixed body. Moreover, in a special case, the invention may even be applied to a rail wagon; such an application would, for example, be advantageous when transporting concrete to prearranged locations alongside a rail track, say during the building of pylon foundations in connection with rail electrification work.

According to this invention, the body of a wheeled transport vehicle has incorporated therein one or more screw conveyors (hereinafter for convenience referred to as "worms") and a power unit from which the said conveyor or conveyors is or are adapted to be driven, under the control of an attendant, the worm or worms being so arranged within the vehicle body with respect to a discharge opening or openings, as to effect, upon rotation of the worm or worms, a controlled and regular discharge of the load from the body through the or each opening.

The said discharge opening or openings may advantageously be provided at either or at both ends, and/or at a location or locations intermediate the ends, of a trough in which the worm or worms is or are arranged to operate.

The or each worm is preferably of steel and, depending on the nature of the mix to be discharged from the vehicle body, the trough may also be of steel. Preferably, however, the trough is made of a specially toughened rubber or an equivalent flexible material designed to prevent the pinching of stone particles between the trough and the rotating worm or worms. Moreover, a toughened rubber or like trough is well able to withstand the abrasive nature of a concrete or a mortar.

Thus, by a judicious selection of the selection of the or each worm to be driven, concrete or a like mix can be readily conveyed from and to various locations along the length of the trough after, in the case of a tipping vehicle, the body has been tilted to assist the downward flow of the concrete or other mix into the trough.

In a convenient embodiment of the invention, the aforementioned power unit may consist of a hydraulic motor which the worm or worms is or are driven through reduction gearing and selector clutches of any appropriate character. With regard to the application of such discharge means to a transport vehicle of the type having a tipping body, the hydraulic motor may conveniently be supplied with fluid from the pump usually provided as part of the standard equipment of such a tipper. If necessary, however, a hydraulic fluid reservoir, a pump and valve means must be specially provided for the purpose in view.

In accordance with a further and important feature of this invention, there may advantageously be provided, in combination with the discharge worm or worms and the means for driving the same, members or elements arranged for engagement within the load ot be discharged and adapted to have imparted thereto vibrations of a predetermined, but preferably variable, amplitude for the purpose of inducing improved flow characteristics in the concrete or like mix. The vibrations may be created by appropriate flow of hydraulic fluid and may, for instance, produce a similar effect to the hand-controlled poker vibrations normally employed in placing and compacting concrete within framework. These vibrating members or elements would materially assits the flow into the trough of the drier mixes of concrete and so ensure a regular discharge of concrete through the discharge opening or openings.

In any event, the means of this invention may advantageously be arranged to discharge a load from the rear end of the vehicle body. The actual discharge location or locations, however, may be situated either centrally in the rear end of the body or at either or both sides of such rear end, according to requirements.

According to a further important aspect of the invention, regarding the application of the same to a road transport vehicle of the type having a tipper body, the conventional swinging tail-gate at the rear end of such body may, in accordance with the preferred embodiment of this invention, be at least temporarily replaced by a specially designed fixed tail-gate carrying a trough and adapted to support a worm or worms, a hydraulic motor and a plurality of vibrating tubes.

Figure 2:
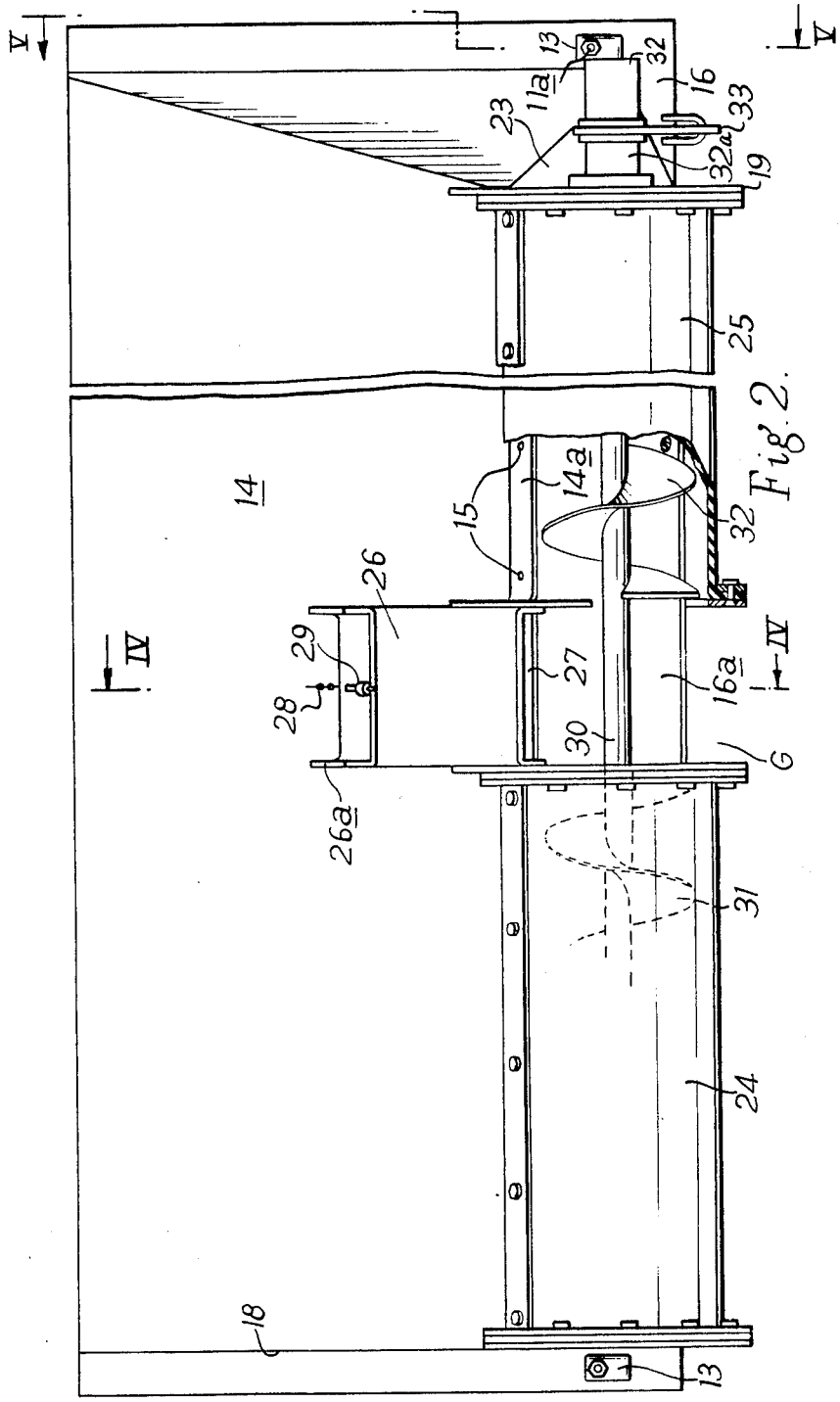
Figure 3:
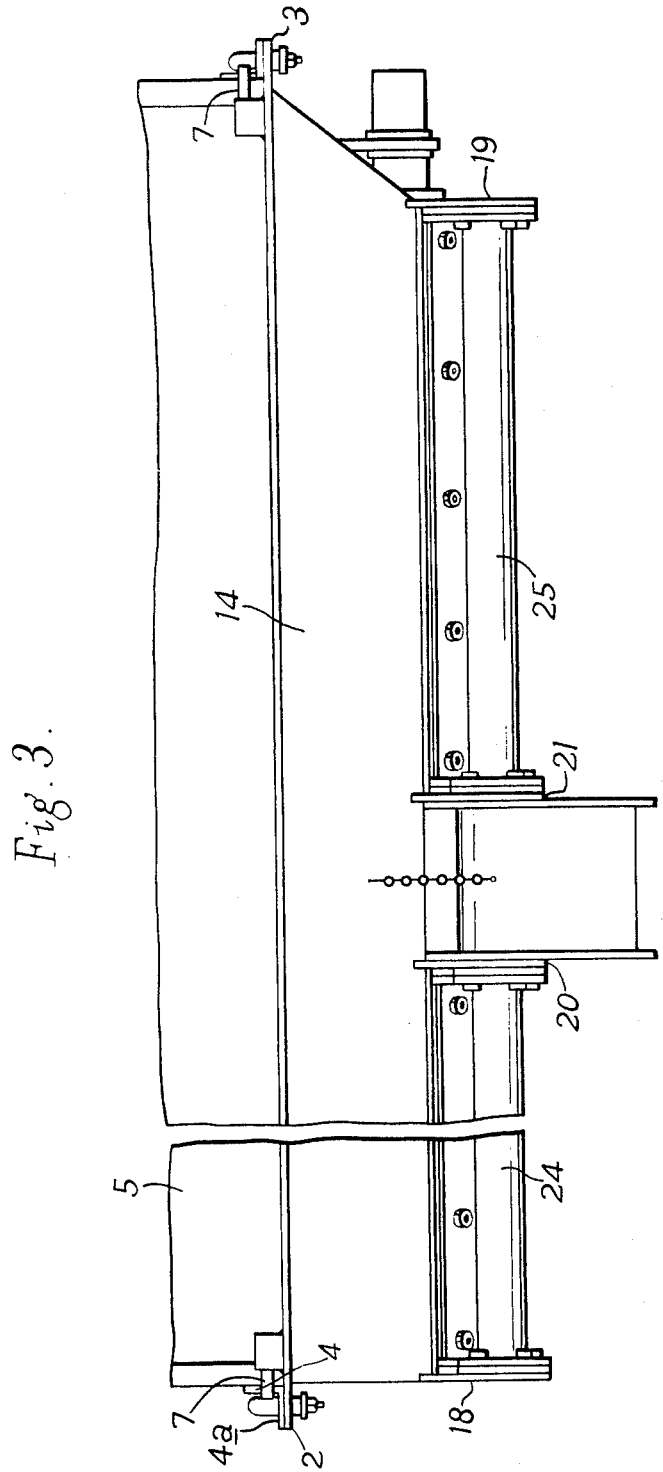
Figure 4:
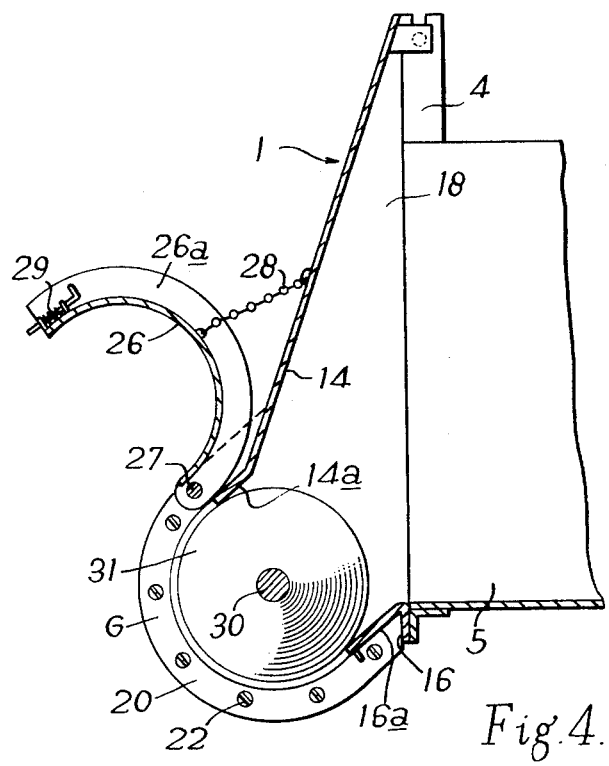
Figure 8:
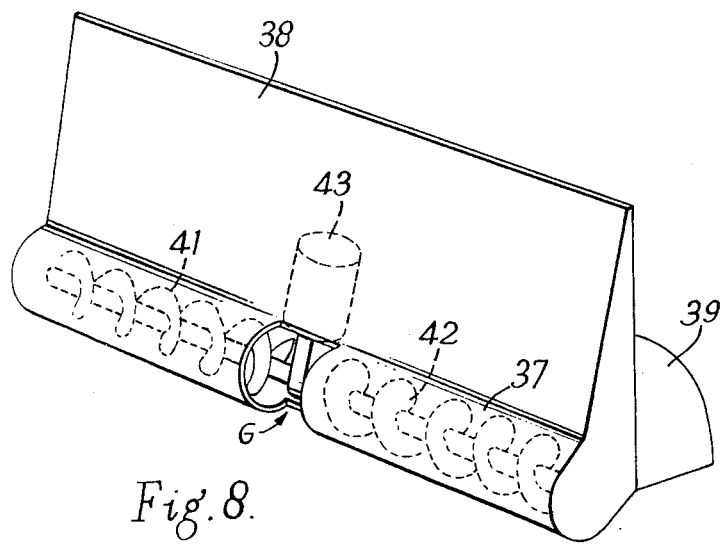
Figure 9:
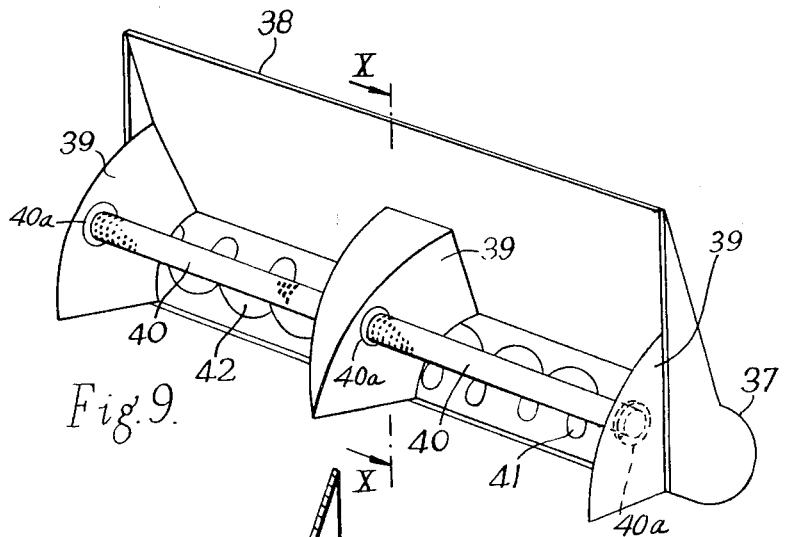
Figure 10:
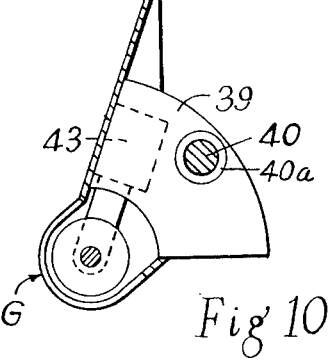
Figure 11:
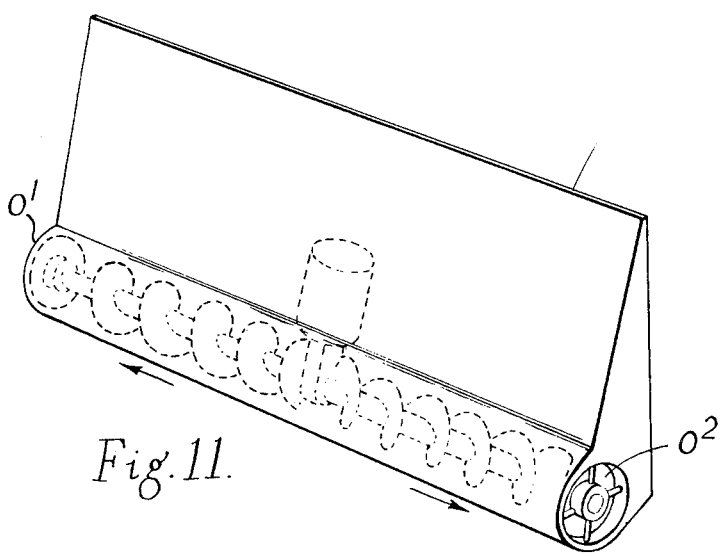
Figure 12:
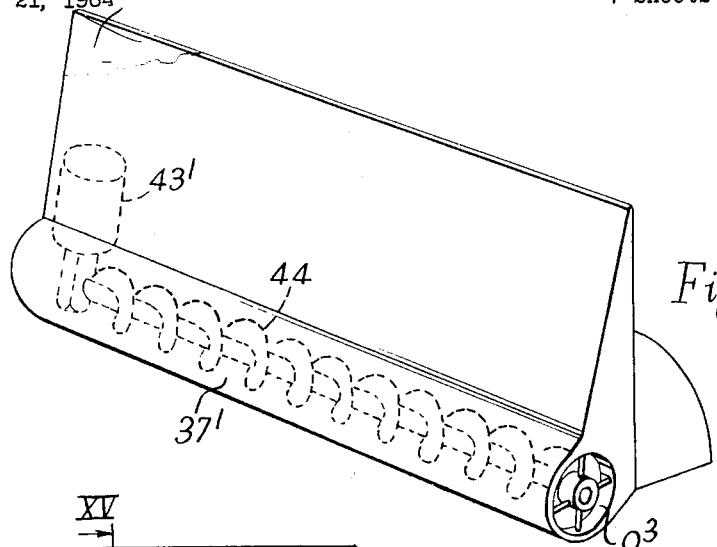
Figure 13:
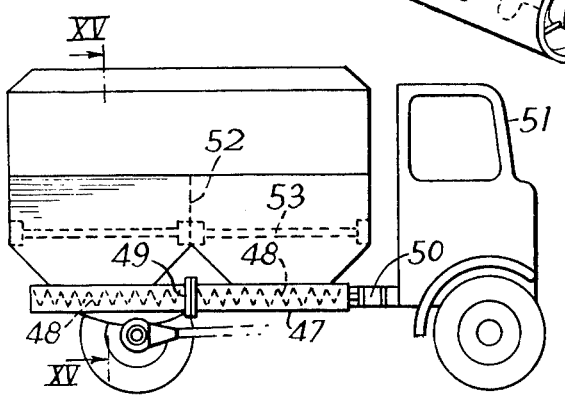
Figure 14:
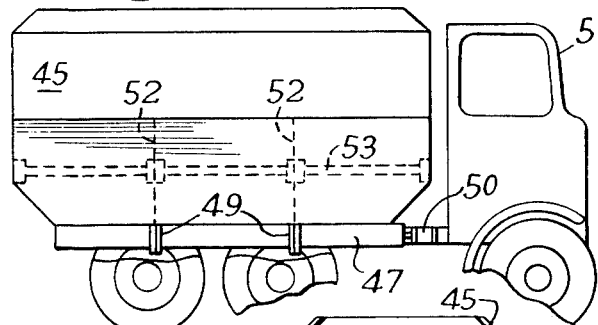
Figure 15:
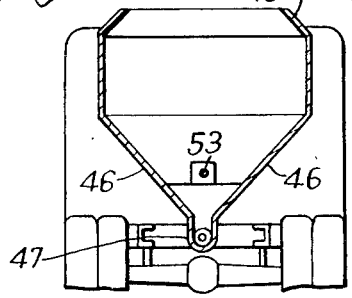

In order that the invention may be more clearly understood and readily carried into practical effect, specific constructional examples thereof as applied both to a tipper body and to a fixed vehicle body will now be described with reference to the accompanying drawings, wherein, FIGURE 1 is a side view of a typical tipping wagon provided with a fixed tail-gate constructed in accordance with this invention, FIGURE 2 is an end elevation of the said tail-gate, FIGURE 3 is a plan view of the same, FIGURE 4 is a cross-sectional view of the tail-gate, taken on the line IV—IV of FIGURE 2 and shown attached to a tipper body, FIGURE 5 is a further cross-sectional view taken on the line V—V of FIGURE 2, FIGURES 6 and 7 are detail front and side views respectively of the releasible door through which concrete is discharged from the troughs of the tail-gate, FIGURES 8 and 9 are general perspective views of another form of tail-gate adapted to be fixed in position at the back of a tipper body, FIGURE 10 is a cross-sectional view taken on the line X—X of FIGURE 9, FIGURES 11 and 12 are two perspective views illustrating further alternative constructions of a fixed tailgate within the scope of the invention, FIGURES 13 and 14 are diagrammatic side views depicting two alternative forms of transport vehicles each having a fixed body furnished with concrete or like discharge means in accordance with this invention, and FIGURE 15 is a cross-sectional view taken on the line XV—XV of FIGURE 12.

Like parts are designated by similar reference characters throughout the drawings.

Referring to the example illustrated in FIGURES 1–7, it will be seen that the steel tail-gate 1 has formed at its opposite ends two vertically disposed flat flanges or protruding margins 2 and 3. These flanges or margins are adapted to be secured in position against corresponding vertical flanges such as 4a (FIGURE 3) provided on members 4 at opposite sides of the initially open rear end of the tipper body 5 of the transport vehicle 6. At its opposite ends, and practically coincident with its upper edge, the tail-gate 1 is furnished with axially aligned laterally projecting pins 7 which are adapted to be engaged in recesses 8 formed in the upper ends of the members 4. Cut in the lower end portion of each of the vertical flanges 2 and 3 is a rectangular opening 9 to the perimeter of which is welded a short hollow or tubular component 10 of corresponding shape. To fit and secure the tail-gate 1 in position upon the back of the tipper body 5, the pins 7 are first engaged in the recesses 8 and then the gate is swung down about the common axis of the said pins. As a consequence, outer screw-threaded ends 11a of bolts 11 (having hook-shaped inner ends 11b previously hooked on to transverse pins such as 12 set in the lower ends of the members 4), will be found to extend right through the hollow or tubular components 10. Next, a peripherally flanged plate 13 having a hole formed therein is fitted upon the outer end of each hollow or tubular component 10, with the screw-threaded outer end of the corresponding bolt 11 projecting through the hole. A nut 11c is finally applied to each bolt 11 and is screwed home tight against the outer face either of the relevant flanged plate 13, or of an associated washer, to complete the fastening.

A plane back wall 14 of the tail-gate 1 slopes downwardly and rearwardly from the top edge of the rear end of the tipper body 5 and at its lower margin is provided with an upper, transversely extending flange 14a having formed therein a series of small equally spaced bolt holes 15. A suitably supported downwardly sloping lower transverse flange 16a is welded in position at the lower end of a vertical front wall 16 of the steel tail-gate and is similarly formed with a series of small bolt holes 17. The back wall 14 and front wall 16 are rigidly connected by a flat end wall 18 and, at their lower ends, by three U-shaped flange-like elements of flat section, viz. an end element 19 and two elements 20 and 21 spaced apart and centrally located as shown in FIGURES 2 and 3. The end wall 18 and each of the U-shaped elements 19, 20 and 21 has formed therein a substantially semi-circular series of small bolt holes such as 22. The end of the tail-gate 1 remote from the flat end wall 18 is closed by a suitably shaped cover 23.

Secured by nut and bolt fastenings to the upper and lower transverse flanges 14a and 16a and to the end wall 18 and the flange-like U-shaped elements 19, 20 and 21 are two U-shaped toughened rubber (Fortiflex) troughs 24 and 25. Thus, the trough 24, formed with longitudinal and end flanges, reinforced by steel strips and U-shaped elements drilled with appropriate bolt holes corresponding in position with the bolt holes 22, is secured in position between the end wall 18 and the element 20, whilst the trough 25 similarly flange and reinforced is secured between the elements 19 and 21. The upper edge of the flange 16a is substantially on the same level as that of the floor of the tipper body 5. The axially aligned troughs 24 and 25 extend transversely at right angles to the longitudinal median line of the body 5, and the gap G left between the opposed inner ends of the said two troughs provides a central opening for the discharge of concrete.

A hinged steel door 26 of semi-circular shape in cross-section and flanged at its ends, as indicated at 26a in FIGURES 6 and 7, is provided for normally closing the discharge opening G. The hinge pin 27 of this door extends between, and is mounted in, the two central flange-like elements 20 and 21. As depicted in FIGURE 4, a chain 28 is provided to hold the door 26 in its open position, whilst a quick-release catch 29 is associated with the door to retain it in its closed position.

Mounted to rotate in suitable bearings carried by the tail-gate 1 is a shaft 30 upon which are provided two steel worms 31 and 32, these worms being respectively left-hand and right-hand and accommodated within the troughs 24 and 25. The pitch of the worms may vary, according to requirements. The shaft 30 is adapted to be driven from an orbital hydraulic motor 32 through the medium of a flexible coupling 32a. The motor 32, is designed to impart a speed of about 20 r.p.m., is mounted on a torsion plate 33, and is supplied with fluid by means of a pump 34, via a fluid control valve 35 (see FIGURES 1 and 5). This pump constitutes part of the standard tipping gear of the vehicle. The fluid control valve for such tipping gear is indicated at 36.

Referring now to the further practical form of fixed tail-gate illustrated in FIGURES 8, 9 and 10, a toughened rubber trough 37 of shallow J-shaped section extends along the bottom of gate 38, rigidly secured at one free margin to the bottom frame of the said gate at the level of the floor of the tipper body, and at the other free margin to the specially shaped steel plate of the gate. The trough 37 thus extends transversely and at right angles to the longitudinal median line of the body, but, as shown, is discontinued in the middle of the gate to leave an opening G for the discharge of the concrete from either a right-handed or a left-handed worm.

Rigidly secured to the inner, i.e. forward, side of the fixed gate, in the angle between the gate 38 and the floor of the tipper body, are three suitably shaped spaced webs or fillets 39—one at each of the opposite ends of the gate and a third in a central position between the other two. These webs or fillets 39 serve the dual purpose of streamlining the downward flow of concrete, by eliminating corners, and also of providing supports for two vibrator tubes 40 adapted to function as independent poker vibrators. The vibrator tubes are similar to the poker vibrators commonly used in the building industry to compact wet concrete. They are given a low amplitude high-frequency movement by the rotation of a motor which commonly is contained within the tube, and are powered either electrically, pneumatically or by an oil engine. While the particular drive arrangement forms no part of the instant invention, a suitable arrangement for the instant application might include a D.C. motor driven from the truck battery, or alternatively a pneumatic motor with provision for coupling to an air supply on site. These vibrator tubes 40 are co-axially arranged and extend parallel to the common axis of the right- and left-handed steel worms 41 and 42 arranged for rotation within the rubber trough 37. The said tubes 40 are spaced radially from the worm axis to the extent of anything from say, 12" to 18". Rubber bushes 40a are provided as shown in FIGURE 9 to isolate the vibrations from the webs or fillets 39. In this particular example, a centrally mounted hydraulic motor 43 placed partly within the central web or fillet 39 is employed, and the arrangement of the two opposite-handed independent worms 41 and 42 is such as to discharge the concrete or like mix through the common central discharge opening G adjoining the opposed inner ends of the worms.

Alternatively, the mix may be discharged through two side openings O¹ and O² adjoining the outer ends of the two worms 41 and 42 respectively, all as shown in FIGURE 11.

In the modification of the fixed tail-gate illustrated in FIGURE 12, a single worm 44, or two co-axially connected worms of the same hand, is or are arranged to discharge through an opening O³ at one end only of the trough 37′, i.e. from one side only of the vehicle, the hydraulic motor 43′ in this case being located at the opposite end of the trough.

In the application of the invention to a fixed vehicle body 45 the lower portion of which has downwardly and inwardly inclined floor portions 46 so as to be of V-form in cross-section (see FIGURES 13, 14 and 15) a toughened rubber trough 47 is mounted at the bottom of the V and extends longitudinally along the whole length of the vehicle body. To minimise the power requirements for driving the conveying means in this example, a plurality of, e.g. two or three, comparatively short screws 48 are arranged to rotate in the trough, these screws being co-axial and connected by suitable clutch couplings 49 suchwise as to provide what is, in effect, a single longitudinally extending worm driven, through reduction gearing, from a hydraulic motor 50 located at the forward end of the trough—adjacent to the driver's cabin 51.

In such a case the interior of the fixed vehicle body 45 is partitioned transversely by partition 52 into a plurality of compartments—one to each screw 48— and the vibrator members may consist of bars 53 arranged horizontally above the trough 47. The vibrator bars thus constitute, in this example, a false floor or bottom through which the concrete or like mix is shaken to fall into the trough in readiness for discharge in a controlled manner at the rear end of the latter.

I claim:

In a wheeled transport vehicle equipped with a tipper body adapted to contain a load of wet concrete mix, discharge means comprising, in combination: a metal tail-gate having thereon fittings enabling it to be removably fixed upon the initially open rear end of the tipper body; two aligned troughs of toughened rubber which are attached to the lower edge portion of said tail-gate and are arranged to receive wet concrete mix flowing into it from the tipper body, said troughs being spaced apart axially on the tail-gate to provide therebetween a central discharge opening; a releasable hinged door for closing said opening; left-hand and right-hand metal screw conveyors respectively operating in the troughs; a common shaft for the screw conveyors; a hydraulic motor from which said shaft is rotatably driven, the motor being located at one end of the tail-gate; coupling means interposed between said hydraulic motor and said shaft; fluid control valve means for controlling the hydraulic motor; and vibrator tubes arranged coaxially of one another and extending parallel to the common axes of the right-handed and left-handed screw conveyors; whereby upon rotation of the common shaft the opposite handed screw conveyors will effect a controlled and regular discharge of the load of wet concrete mix from the body through the discharge opening.

References Cited by the Examiner

UNITED STATES PATENTS

| 2,780,370 | 2/1957 | Pudwell | 214—83.32 |
|---|---|---|---|
| 2,879,910 | 3/1959 | Johnson | 214—508 |
| 3,031,064 | 4/1962 | Kline | 198—64 X |
| 3,056,521 | 10/1962 | Marr | 214—508 |
| 3,171,558 | 3/1965 | Sharp | 214—522 |

FOREIGN PATENTS

| 1,080,785 | 6/1954 | France. |
|---|---|---|
| 795,679 | 5/1958 | Great Britain. |

GERALD M. FORLENZA, *Primary Examiner.*

A. J. MAKAY, *Assistant Examiner.*